United States Patent [19]
Bell

[11] 4,219,234
[45] Aug. 26, 1980

[54] RECLINING AND EMERGENCY LATCH MECHANISM FOR VEHICLE SEATS

[75] Inventor: Robert L. Bell, Oxford, Mich.

[73] Assignee: Fisher Corporation, Troy, Mich.

[21] Appl. No.: 946,510

[22] Filed: Sep. 28, 1978

[51] Int. Cl.² ............................................ A47C 1/027
[52] U.S. Cl. .................................... 297/374; 16/140; 297/379
[58] Field of Search ............... 297/374, 375, 354, 355, 297/363–369, 378, 379, 216; 16/139, 140; 248/410

[56] References Cited

U.S. PATENT DOCUMENTS

| | | | |
|---|---|---|---|
| 1,080,714 | 12/1913 | Meyrose | 297/375 X |
| 2,290,672 | 7/1942 | Cantor | 297/374 |
| 3,195,952 | 7/1965 | Bache et al. | 297/374 |
| 3,214,122 | 10/1965 | Frederickson | 248/410 X |
| 3,628,831 | 12/1971 | Close | 297/379 |
| 3,999,247 | 12/1976 | Cremer | 297/369 X |
| 4,010,979 | 3/1977 | Fisher et al. | 297/379 |
| 4,103,967 | 8/1978 | Tanaka et al | 297/379 X |
| 4,143,913 | 3/1979 | Rumpf | 297/379 |

FOREIGN PATENT DOCUMENTS

| | | | |
|---|---|---|---|
| 279647 | 12/1913 | Fed. Rep. of Germany | 297/375 |
| 2641587 | 3/1978 | Fed. Rep. of Germany | 297/379 |
| 1260755 | 4/1961 | France | 297/374 |
| 1466417 | 12/1966 | France | 297/375 |

Primary Examiner—William E. Lyddane
Attorney, Agent, or Firm—Harness, Dickey & Pierce

[57] ABSTRACT

The disclosure relates to a latch structure for controlling movement of a pivoted vehicle seat back rearwardly to a reclining position and forwardly to facilitate entry to the rear seat of the vehicle. A spring loaded latch latches the seat at any desired reclining position. A normally locked inertia lock is provided to maintain the seat back in the locked condition relative to the seat cushion during normal vehicle operation and upon sudden deceleration of the vehicle yet automatically opens to provide for forward movement of the seat back when the vehicle is in the static condition.

2 Claims, 9 Drawing Figures

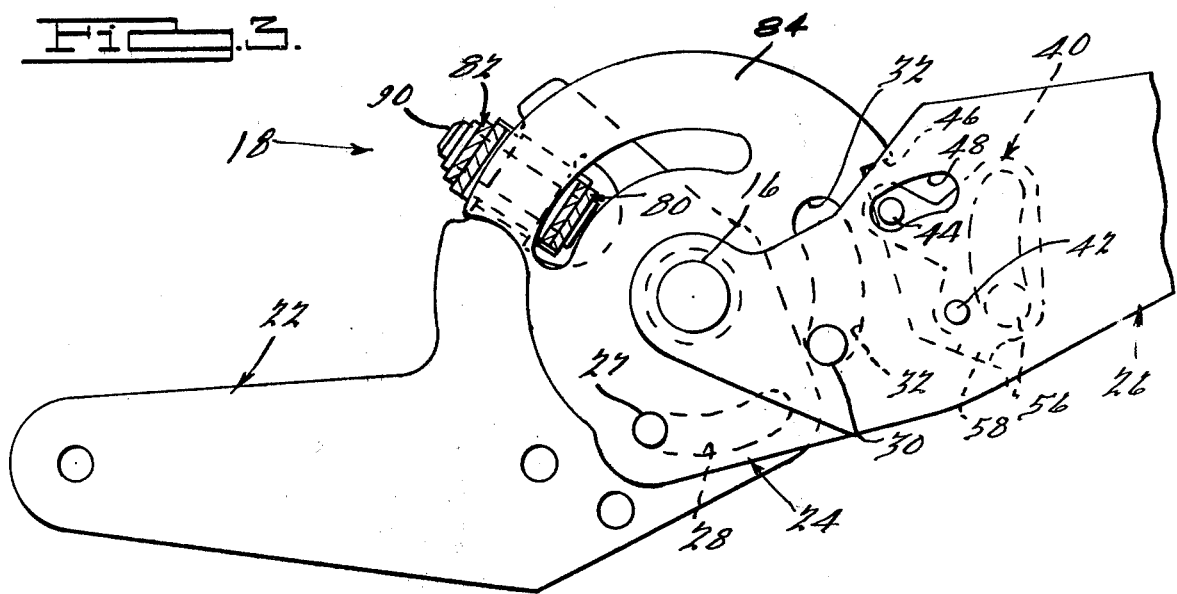
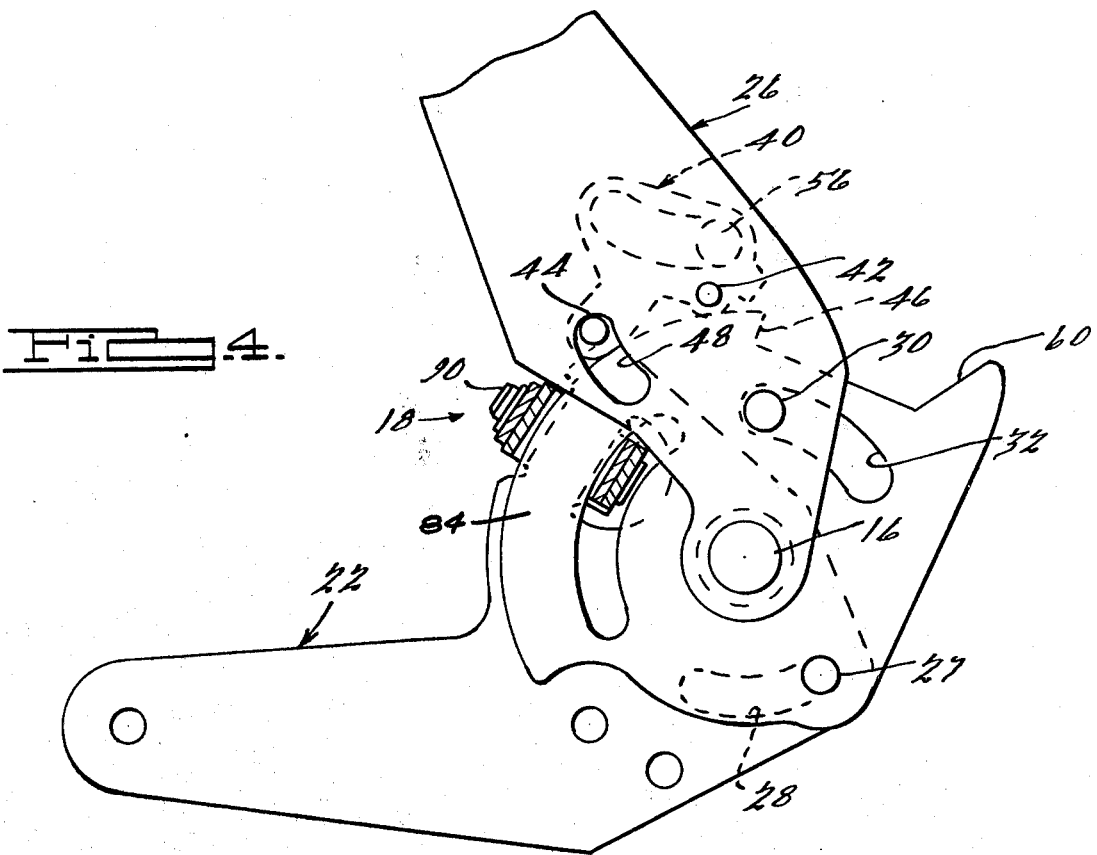

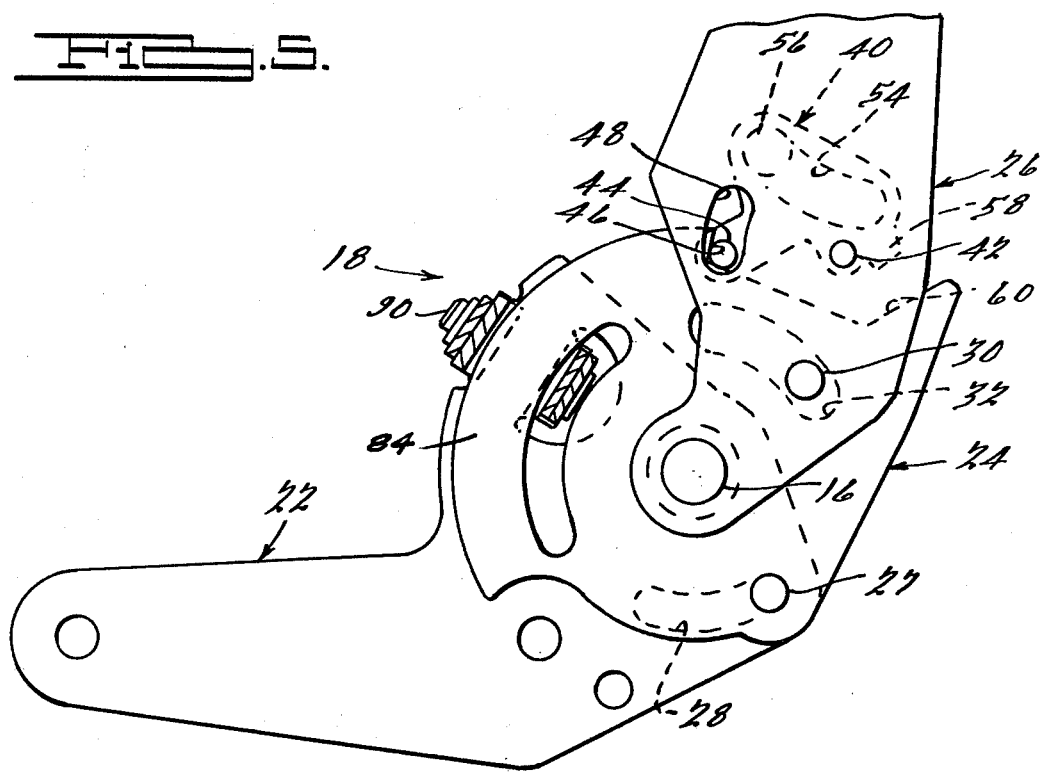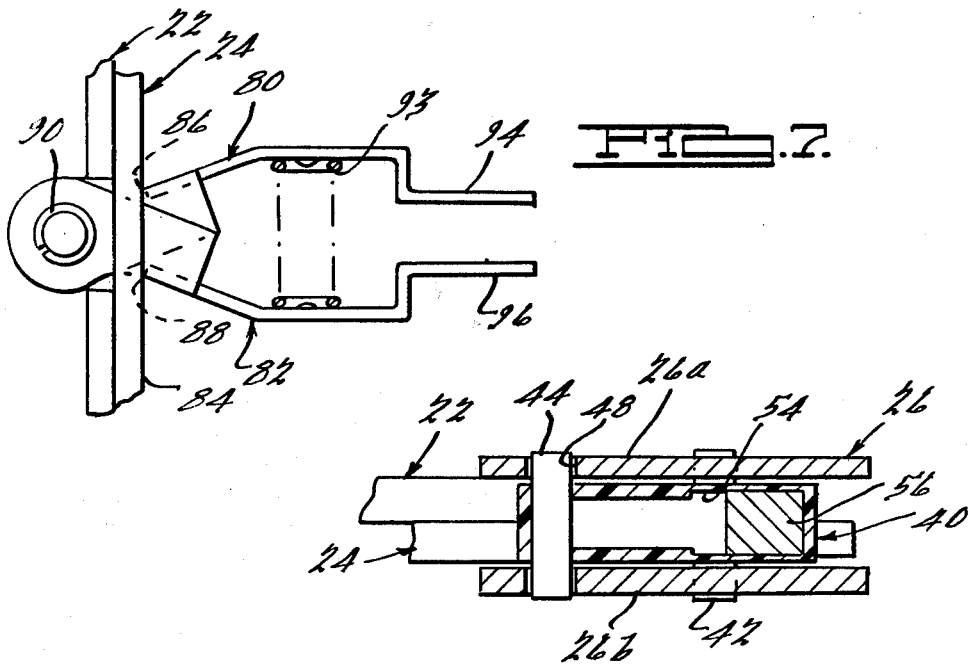

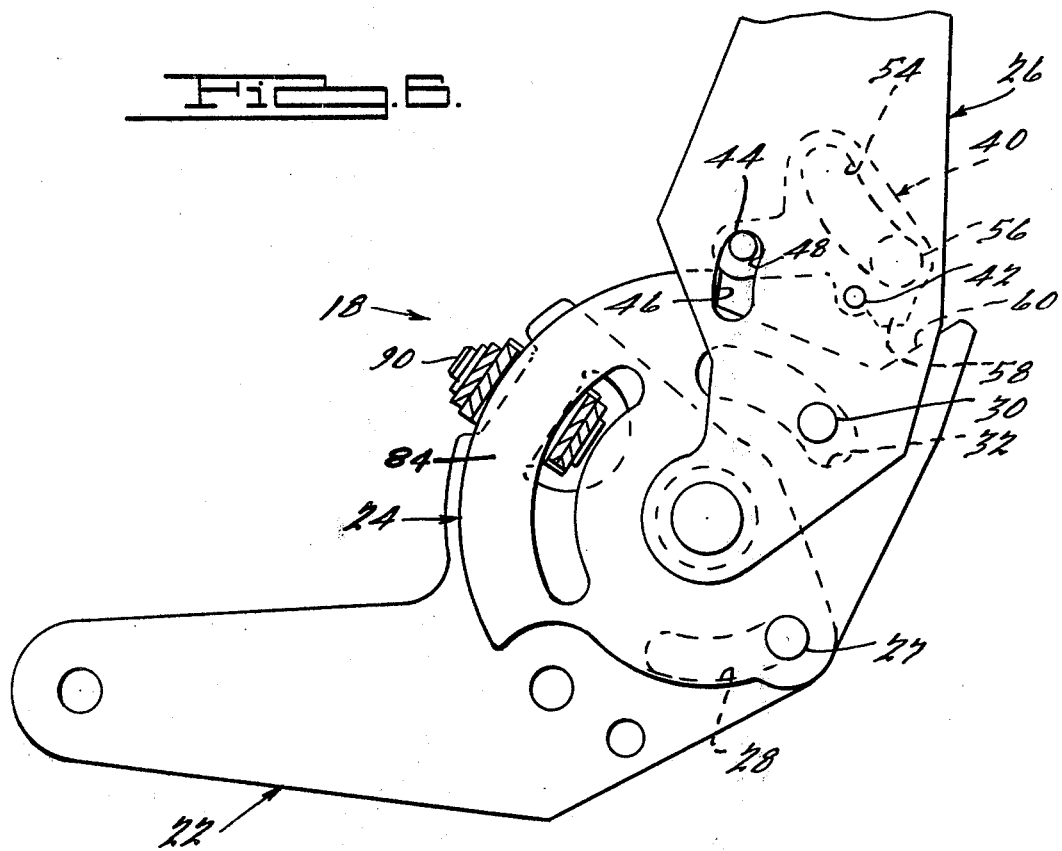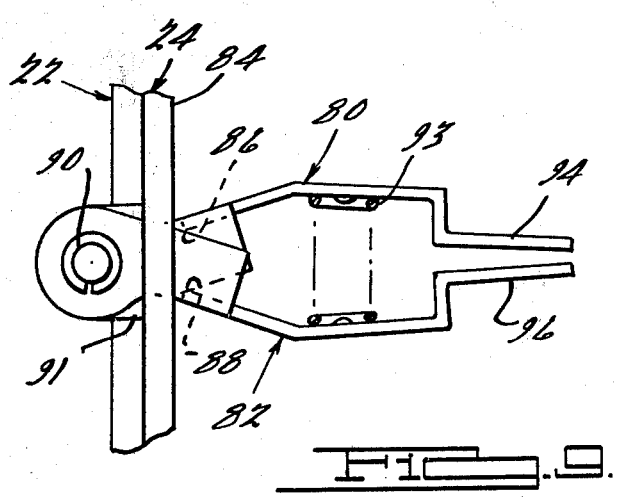

RECLINING AND EMERGENCY LATCH MECHANISM FOR VEHICLE SEATS

BACKGROUND OF THE INVENTION

Reclining seat backs are increasingly popular in motor vehicles. When employed in two-door motor vehicles, the latch mechanisms for such seat backs must positively latch the seat back against both undesired rearward and undesired forward pivotal movement relative to the seat cushion.

With respect to reclining movement, manually operated reclining latch structures for holding the seat back in a desired reclining position are known. However, such known manually operated latches are generally unsatisfactory in that they latch only at incremental reclining positions or, if infinitely adjustable, are heavy and cumbersome and relatively expensive. To overcome this situation the reclining latch mechanism of the instant invention is infinitely adjustable, fool-proof in operation, and of simple and inexpensive construction.

With respect to forward movement of the seat back, normally open emergency latches have been heretofore proposed which latch upon rapid deceleration of the vehicle. See, for example, U.S. Pat. No. 4,010,979. Preferably however, the emergency latch for the seat back is normally latched so as to eliminate the time lag between the advent of deceleration and lockup. It is also desirable to provide means to automatically open the emergency latch to permit forward movement of the seat back to facilitate entry to the back seat of the vehicle when the vehicle is not subject to deceleration forces.

SUMMARY OF THE INVENTION

A reclining and emergency latch mechanism for a vehicle seat in accordance with the instant invention, comprises a seat cushion bracket attachable to the cushion of the vehicle seat. A seat back bracket is attached to the seat back of the seat and is rotatably joined to the seat cushion bracket by a pivot pin. A clutch quadrant is supported by the pivot pin for rotation relative to both the seat cushion bracket and the seat back bracket. An infinitely adjustable reclining latch is mounted on the seat cushion bracket for engagement with the clutch quadrant for controlling rotation thereof. A normally latched emergency or inertia responsive latch is mounted on the seat back bracket for controlling forward rotation of the seat back relative to the clutch quadrant.

Therefore, one object of this invention is an improved vehicle seat latch mechanism that provides for infinite adjustment of the seat back relative to a vehicle seat.

A further object of this invention is a seat latch mechanism that incorporates an inertia operated latch for the vehicle seat back that is maintained in the latched position both in normal operation and during relatively high vehicle decelerations but is automatically released upon manual movement of the seat towards a forward position when the vehicle is in the static condition.

BRIEF DESCRIPTION OF THE DRAWINGS

FIG. 3 is a side elevational view, similar to FIG. 2, showing the structure in the fully reclined position;

FIG. 4 is a side elevational view, similar to FIG. 2, showing the seat in the forward condition to facilitate access to the rear seat of a vehicle;

FIG. 5 is a side elevational view, similar to FIG. 2, showing the seat back in the latched condition due to vehicle deceleration;

FIG. 6 is a side elevational view, similar to FIG. 2, showing the seat advanced to the inertia latch release position;

FIG. 7 is a view taken in the direction of the arrow "7" of FIG. 2;

FIG. 8 is a view taken generally along the line 8—8 of FIG. 2;

FIG. 9 is a view similar to FIG. 6, showing the reclining latch in the unlatched condition.

DETAILED DESCRIPTION OF THE PREFERRED EMBODIMENT

Figure 1:
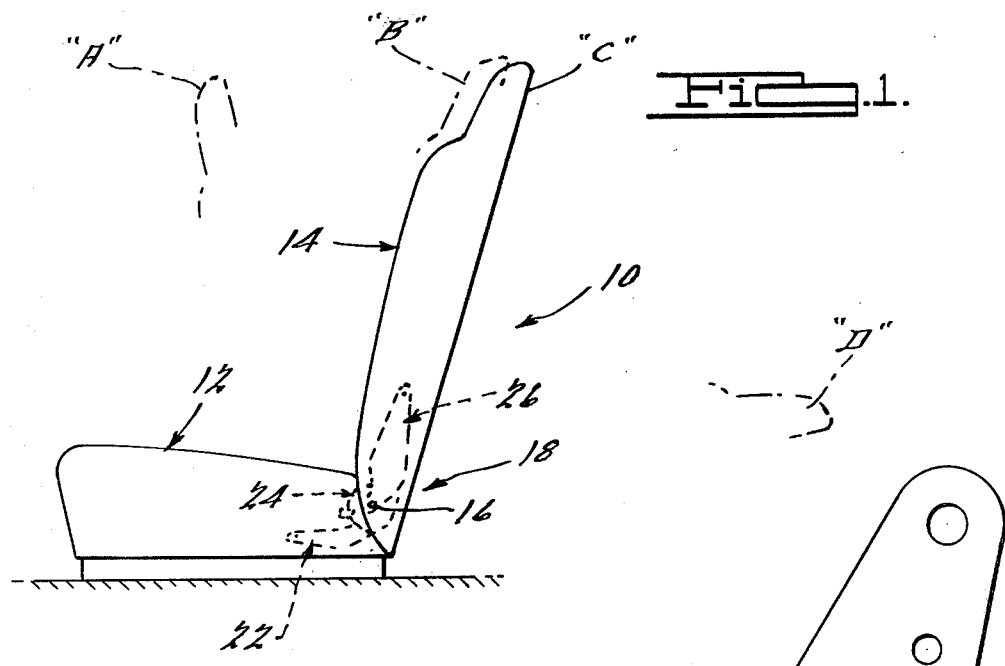
FIG. 1 is a side elevational view of a vehicle seat embodying the instant invention.

Referring to the drawings, FIG. 1 shows, in schematic fashion, a vehicle seat assembly 10, incorporating a latch mechanism in accordance with the subject invention. The seat assembly 10 is of the type conventionally found in the front seat of two-door motor vehicles and comprises a seat cushion 12 and a seat back 14. The seat back 14 is supported for pivotal movement relative to the seat cushion 12 as by a pin 16 so as to permit the seat back 14 to be folded forwardly to provide access to the rear seat of the associated vehicle as well as to be folded rearwardly to a desired reclining position. A latch mechanism, indicated generally by the reference numeral 18, is provided for controlling reclining movement of the seat back 14, for preventing forward pivotal movement of the seat back 14 due to sudden vehicle decelerations and for accommodating desired forward movement of the seat back 14.

In FIGS. 2 through 9, the upholstery of the seat cushion 12 and seat back 14 has been deleted and only the structural components necessary to an understanding of the invention have been illustrated.

Affixed to the frame of the seat cushion 12 is a seat cushion bracket 22, which pivotally supports a clutch quadrant 24 by means of the pivot pin 16. The clutch quadrant 24 is pivotally supported by the pin 16 for rotation relative to the seat cushion bracket 22 as well as to a seat back bracket 26. Rotation of the quadrant 24 relative to the seat cushion bracket 22 is stopped after a predetermined angular displacement by engagement of a pin 27 therein with the end portion of an arcuate slot 28 in the bracket 22. Similarly, rotation of the seat back bracket 26 relative to the quadrant 24 is stopped by engagement of a pin 30 in the bracket 26 with the ends of a slot 32 in the quadrant 24.

In accordance with one feature of the instant invention, the latch structure 18 comprises a pivotally supported inertia member cage 40 that may be formed of plastic or the like. The cage 40 is supported for rotation relative to the seat back bracket 26 by a pivot pin 42. The inertia member cage 40 carries a transversely extending latch pin 44 that is adapted to cooperate with a shoulder 46 on the quadrant 24 and the edges of an arcuate slot 48 in the seat back bracket 26 to limit forward rotation of the seat back 14. It is to be noted that the pin 44 extends across two spaced portions 26a and 26b, of seat back bracket 26 (FIG. 7), so that no load is placed on the inertia member cage 40.

The inertia member cage 40 is formed with an internal track 54 for the acceptance of a generally disc-shaped inertia member 56 which is rollable therealong, as will be described.

Figure 2:
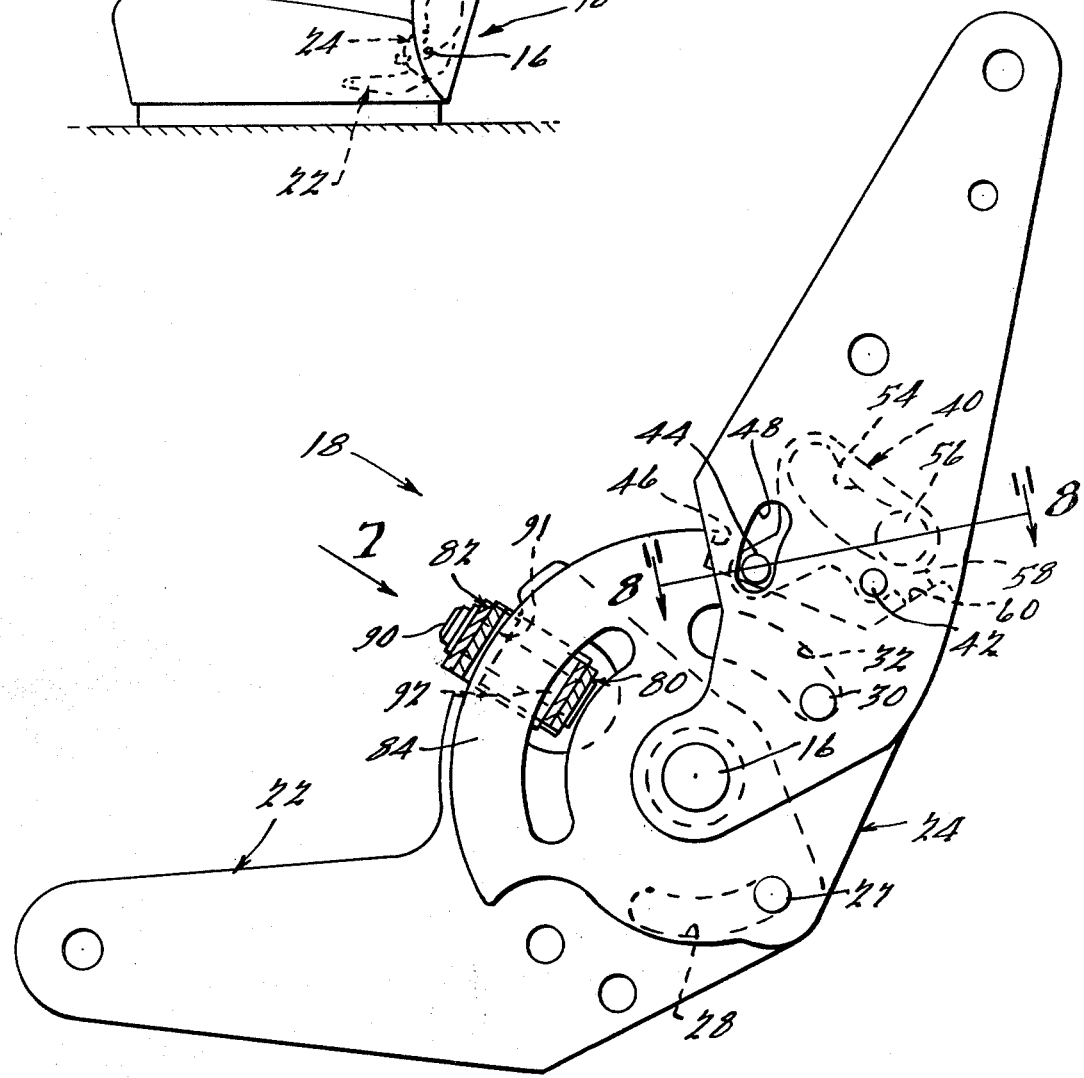
FIG. 2 is an enlarged side elevational view, with the seat cover broken away and other portions removed, of the seat shown in FIG. 1 showing the details of the latch structure.

FIG. 2 shows the latch mechanism 18 in its normal or latched and upright condition denoted by the full line position "c" in FIG. 1. In this condition, the inertia member 56 is positioned to the right of the pivot pin 42 that supports the cage 40 in which position the weight of the inertia member 56 causes the inertia member cage 40 to be biased clockwise. However, rotation of the inertia member cage 40 is limited by engagement of a boss or shoulder 58 thereon with an abutment 60 on the quadrant 24 thereby normally maintaining the pin 44 in alignment with the shoulder 46 on the clutch quadrant 24 so as to be engagable therewith.

As best seen by comparing FIGS. 2 and 5, if the associated vehicle decelerates suddenly or is driven rearwardly, as might occur when a standing vehicle is struck headon by a vehicle traveling in the opposite direction, the inertia member 56 rolls along the track 54 effecting a counterclockwise bias on the inertia member cage 40 thereby holding the pin 44 at the lower end of the track 48 so that it is maintained in a position to engage the shoulder 46 on the quadrant 24. Thus, when the vehicle is subject to a deceleration force, forward pivotal movement of the seat back 14 relative to the clutch quadrant 24 and the seat cushion bracket 22 about the pivot pin 16 is stopped at the broken line position "B" of FIG. 1, assuming the quadrant 24 is latched relative to the bracket 22, as will be described.

The inertia member cage 40 is positively held in the aforesaid latched position until deceleration ceases and the inertia member 56 returns to the position shown in FIG. 2. While the bias on the inertia member cage 40 reverses when the seat back 14 moves from the "B" position to the "C" position of FIG. 1, the pin 44 on the inertia member cage 40 is maintained in the locked position shown in FIG. 2, due to engagement of the boss 58 thereon with the abutment 60 on the clutch quadrant 24. Thus, the seat back 14 is normally maintained in the latched condition. Stated in another manner, the pin 44 does not have to move to a latched position in order to effect locking of the seat back 14 relative to the seat 12 upon the occurrence of deceleration of the vehicle.

When the vehicle is in the static condition or is not subject to deceleration forces and it is desired to move the seat back 14 forward relative to the seat 12 to the broken line position "A" in FIG. 1, thereby to facilitate access to the rear seat of the vehicle, the first increment of rotation of the seat back 14 towards the "B" position of FIG. 1, permits the inertia member cage 40 to rotate clockwise, as seen in FIG. 6 of the drawings, under the clockwise bias of the inertia member 56. When the cage 40 rotates clockwise, the pin 44 is raised within the track 48 in the bracket 26 so as to clear the shoulder 46 on the quadrant 24 permitting the seat back 14 to be pivoted forwardly to the "A" position. Thus, the pin 44 is automatically moved out of the normal or latched condition to accommodate forward movement of the seat back 14 but only when there are no deceleration forces operative on the vehicle. At this time the inertia member 56 is at the right or lowermost portion of its track 54 and exerting a clockwise bias on the inertia member cage 40.

The foregoing description of operation of the inertia locking portion of the latch mechanism 18 presupposes positive positioning of the quadrant 24 relative to the seat cushion bracket 22 and seat 12.

As best seen by comparing FIGS. 2 and 3, both positive positioning of the quadrant 24, yet provision for reclining movement of the seat back 14 is achieved by controlling movement of the quadrant 24 relative to the seat cushion bracket 22. As discussed hereinbefore, the end position "D" of clockwise movement of the seat back 14 relative to the quadrant 24 is defined by engagement of the pin 30 in the seat back bracket 26 with the clockwise end of the slot 32 in the quadrant 24. Similarly, the end position of clockwise rotation of the quadrant 24 is defined by engagement of the pin 27 in the quadrant 24 with the clockwise end of the slot 28 in the seat cushion bracket 22.

In accordance with another feature of the instant invention, latching of the seat back 14 at any desired reclining position intermediate the end positions thereof, is achieved by latching of the quadrant 24 relative to the seat cushion bracket 22 and seat 12. As best seen in FIG. 7, latching is achieved by engagement of a pair of dogs 80 and 82 on the seat cushion bracket 22 with an arcuate portion 84 of the quadrant 24. The dogs 80 and 82 have biting edge portions 86 and 88, respectively, which engage the face of the arcuate portion 84 of the quadrant 24 in biting engagement. It is to be noted that the arcuate portion 84 of the quadrant 24 is backed up by the seat cushion bracket 22 which, in turn, is backed up by a pin 90 which supports the dogs 80 and 82. The pin 90 is journaled in a pair of ears 91 and 92 on the bracket 22. Thus, it will be seen that assembly for latching the quadrant 24 relative to the seat cushion bracket 22 is positively supported, relatively simple, and lightweight in construction. The dogs 80 and 82 are normally biased to the locked condition relative to the quadrant 24 by a helical compression spring 93 which extends between handle portions 94 and 96 of the dogs 80 and 82, respectively.

As best seen in FIG. 9, reclining movement of the seat back 14 is initiated by compression of the spring 93 as by squeezing the handle portions 94 and 96 of the dogs 80 and 82 which effects release of the biting edges 86 and 88 thereon from the arcuate portion 84 of the quadrant 24, conditioning the quadrant 24 for rotation relative to the bracket 22 about the supporting pin 16. Thereafter a rearward push on the seat back 14 is transmitted to the quadrant 24 by the pin 30 on the seat back bracket 26 causing the quadrant 24 to rotate clockwise with the seat back 14 to a desired reclining position. Release of the handles 94 and 96 of the dogs 80 and 82 allows the biting edges 86 and 88 to reengage the arcuate portion 84 of the clutch quadrant 84 and lock the seat back 14 at the desired reclining position.

Forward movement of the seat back 14 is achieved by a similar procedure, movement of the seat back 14 being transmitted to the clutch quadrant 24 by engagement of the pin 44 on the inertia member cage 40 with the shoulder 46 on the clutch quadrant 24.

Obviously, conventional springs (not shown) can be integrated with the aforesaid mechanism 18 to facilitate relative movement of the components, if desired.

What is claimed is:

1. A latch mechanism for controlling rotation of a vehicle seat back relative to a vehicle seat cushion, said mechanism comprising
    a seat cushion bracket on said seat cushion, said bracket having a planar surface,
    a seat back bracket on said seat back, a pivot pin joining said seat cushion bracket and seat back bracket for relative rotation, a disc like clutch quadrant having first and second parallel flat faces supported by said pivot pin for rotation relative to both said seat cushion and seat back, the first face of said clutch quadrant being in juxtaposed relation to the planar surface of said seat cushion bracket, a latch dog pin supported by said seat cushion bracket on the opposite side of said clutch from the planar surface on said seat cushion bracket, the central axis of said latch pin extending at a right angle and intersecting the axis of said pivot pin, said latch pin being spaced from the planer surface of said seat cushion bracket, a pair of latch dogs supported for rotation by said latch dog pin having biting edges engageable with the second face of said clutch, and spring means normally biasing said dogs into engagement with said quadrant and said quadrant into engagement with the planer surface on said seat cushion bracket to preclude rotation of said clutch relative to said seat cushion bracket in either direction about said pivot pin.

2. A latch mechanism for controlling rotation of a vehicle seat back relative to a vehicle seat cushion, said mechanism comprising a seat cushion bracket on said seat cushion, a seat back bracket comprising a pair of spaced plates on said seat back, a pivot pin joining said seat cushion bracket and seat back bracket for relative rotation, a generally flat clutch quadrant supported by said pivot pin for rotation relative to both said seat cushion and seat back brackets, said clutch quadrant having a portion interposed between the spaced plates of said seat back bracket, first latch means on said seat cushion bracket for latching said clutch quadrant against rotation relative thereto, and second latch means for preventing rotation of said vehicle seat back in the direction of forward movement of the vehicle relative to said clutch quadrant during deceleration of the vehicle, said second latch means comprising a shoulder on the interposed portion of said clutch quadrant, a rotatable primary inertia member having a latch pin thereon normally latched with the shoulder on said clutch quadrant and extending through aligned apertures in the spaced plates of said seat back bracket to normally preclude forward movement of said seat back bracket relative to said clutch quadrant, said primary inertia member being rotatable to the latched condition in the same direction relative to said clutch quadrant as said forward direction of rotation of said seat back relative to said clutch quadrant, stop means on said clutch quadrant for normally precluding movement of said primary inertia member in the opposite direction thereby retaining the latch pin thereon in said latched condition in the absence of deceleration inertia forces, said stop means permitting movement of said primary inertia member in said opposite direction to move the latch pin thereon out of engagement with the shoulder on said clutch quadrant upon forward movement of said seat back in the absence of deceleration inertia forces on said vehicle, a track in said primary inertia member, and a secondary inertia member movable along said track from a normal position to a deceleration inertia induced position, said secondary inertia member being operable to maintain the latch pin of said primary inertia member in said latched condition for a finite period of time by changing the center of mass thereof to induce rotation in said forward direction upon the occurrence of deceleration forces on said vehicle.

* * * * *